United States Patent [19]
Apte et al.

[11] Patent Number: 5,970,464
[45] Date of Patent: Oct. 19, 1999

[54] DATA MINING BASED UNDERWRITING PROFITABILITY ANALYSIS

[75] Inventors: Chidanand Vinayak Apte; Edna Grossman, both of Chappaqua; Edwin Peter Dawson Pednault, Cortlandt Manor; Barry Kumin Rosen, Stormville; Fateh Ali Tipu, Wappingers Falls; Hsueh-ju Wang, Mohegan Lake; Brian Frederick White, Yorktown Heights, all of N.Y.

[73] Assignee: International Business Machines Corporation, Armonk, N.Y.

[21] Appl. No.: 08/926,804

[22] Filed: Sep. 10, 1997

[51] Int. Cl.[6] .................................................. G06F 17/60
[52] U.S. Cl. ................................................. 705/4; 705/7
[58] Field of Search ........................... 705/4, 7, 10, 35, 705/36, 38, 2; 706/934, 12, 21, 60, 47; 707/104

[56] References Cited

U.S. PATENT DOCUMENTS

| | | | |
|---|---|---|---|
| 4,766,539 | 8/1988 | Fox ................................................ | 705/4 |
| 4,975,840 | 12/1990 | DeTore et al. ................................ | 705/4 |
| 5,586,313 | 12/1996 | Schnittker et al. ....................... | 707/104 |
| 5,692,107 | 11/1997 | Simoudis et al. .......................... | 706/12 |
| 5,712,984 | 1/1998 | Hammond et al. .......................... | 705/4 |
| 5,752,237 | 5/1998 | Cherny .......................................... | 705/4 |
| 5,781,911 | 7/1998 | Young et al. ............................ | 707/201 |
| 5,809,478 | 9/1998 | Greco et al. .................................. | 705/4 |

OTHER PUBLICATIONS

Gallagher, Cecily, "Risk Classification Aided by New Software Tool,"National Underwriter Property & Casualty Risk Benefits and Management, No. 17, p.19, Apr. 27, 1992.

Derrig, Richard A., "Fuzzy Techniques of Pattern Recognition in Risk and Claims Classification," The Journal of Risk and Insurance, vol. 62 (Sept. 1995), pp. 447–482.

Bentley, Trevor, "Mining for Information," Management Accounting–London, vol. 75, No. 6 (Jun. 1997), p.56.

*Primary Examiner*—Stephen R. Tkacs
*Assistant Examiner*—George D. Morgan
*Attorney, Agent, or Firm*—Whitham, Curtis & Whitham; Stephen C. Kaufman

[57] ABSTRACT

A computer implemented method of underwriting profitability analysis delivers the analytic process to a wide cross section of insurance decision makers. The underwriting profitability analysis system leverages an existing investment in databases and improves underwriting business processes. Data mining techniques are applied to historical policy and claims to extract rules that describe policy holders with homogeneous claim frequency and severity characteristics. These rule sets are used to classify policy holders into distinct risk groups, each with its own set of characteristics, including pure premium. Breaking up a book of business into segments allows identification of sub-populations of policy holders that distinctly deviate from the expected normal pure premium. This identification allow the insurance business analysts to interactively adjust eligibility criteria and examine altered characteristics of the covered segments until satisfactory. The system is implemented on a client server using network centric language technology.

7 Claims, 14 Drawing Sheets

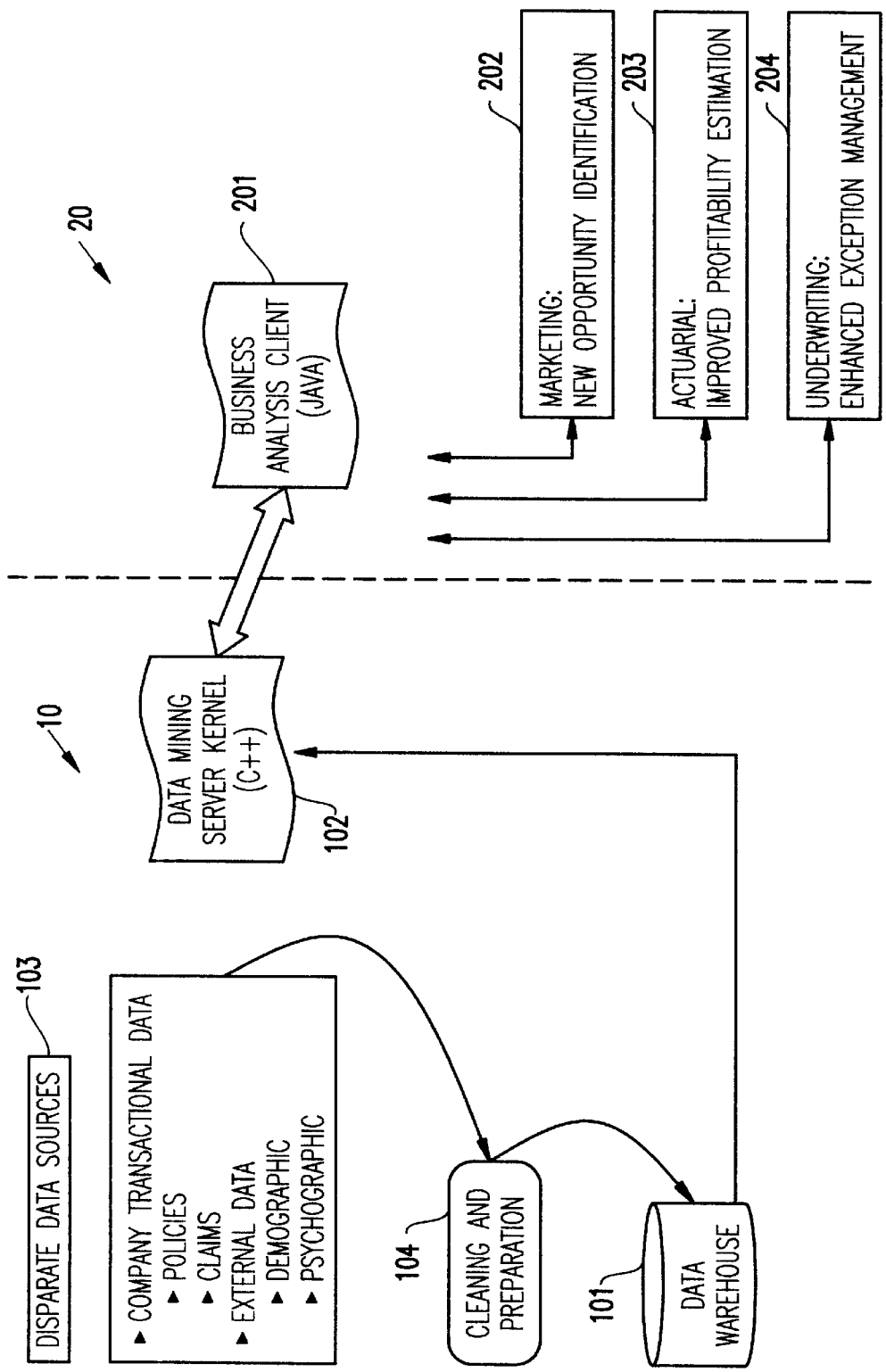

| Field Name | Datatype | Description |
|---|---|---|
| DYESDISC | nominal | Rated Driver YES Discount? |
| DGSDISC | nominal | Rated Driver Good Student Discount? |
| VACAF5 | integer | Vehicle # Accidents last 5 Yrs AtFlt |
| DMILEAGE | ordinal | Rated Driver Mileage |
| HQSDINC | integer | Qtrs Since Last Incr in Num of Drivers |
| VACFF5 | integer | Vehicle # Accidents Last 5 Yrs FltFree |
| HQSADCH | integer | Qtrs Since Household Last Addres Change |
| PSR22 | nominal | Policy SR22 |
| DACAF5Q | real | Driver Accs AtFault Per Qtr Based on 5 Yrs |
| DACAF3Q | real | Driver Accs AtFault per Qtr Based on 3 Yrs |
| DMJDRN | nominal | Rated Driver Any Major Driving Cite? |
| DMDRN | nominal | Rated Driver Any Minor Driving Cites? |
| HMALN | integer | Household Number of Males Drvs |
| PEADND | nominal | Policy AD&D Endorsement? |
| RACCD | integer | Accidents This Qtr Ultimate $ |
| RACCAFD | integer | At Fault Accidents This Qtr Ultimate $ |
| RACCFFD | integer | FaultFree Accs This Qtr Ult$ (Excl Tow) |
| DMARITAL | nominal | Rated Driver Marital Status |
| QRTCODE | nominal | Quarter Code |
| STATE | nominal | State |
| HMJDRN | nominal | Household Any Major Driving Cites? |
| HMDRN | nominal | Household Any Minor Driving Cites? |
| HADDN | integer | Household Number of Address Changes |
| DACFF5Q | real | Driver Accs AtFault Per Qtr Based on 5 Yrs |
| DACFF3Q | real | Driver Accs AtFault Per Qtr Based on 3 Yrs |
| DSRYOUTH | nominal | Rated Driver Senior/Youth Drvr Discount |
| HFEN | integer | Household Number of Female Drvs |
| DMAJDRN | nominal | Rated Driver Any Major Dr/Min Cites? |

DMARITAL

Short description: Rated Driver Marital Status
Datatype: nominal
Start column: 115
End column: 115
Number of records where the field is valid: 10000.
Number of records where the filed is not valid: 0.
Number of records where the field is missing: 0.

Codes:

Y=Yes: 9072 occurrences
N=No: 928 occurrences

FIG.2

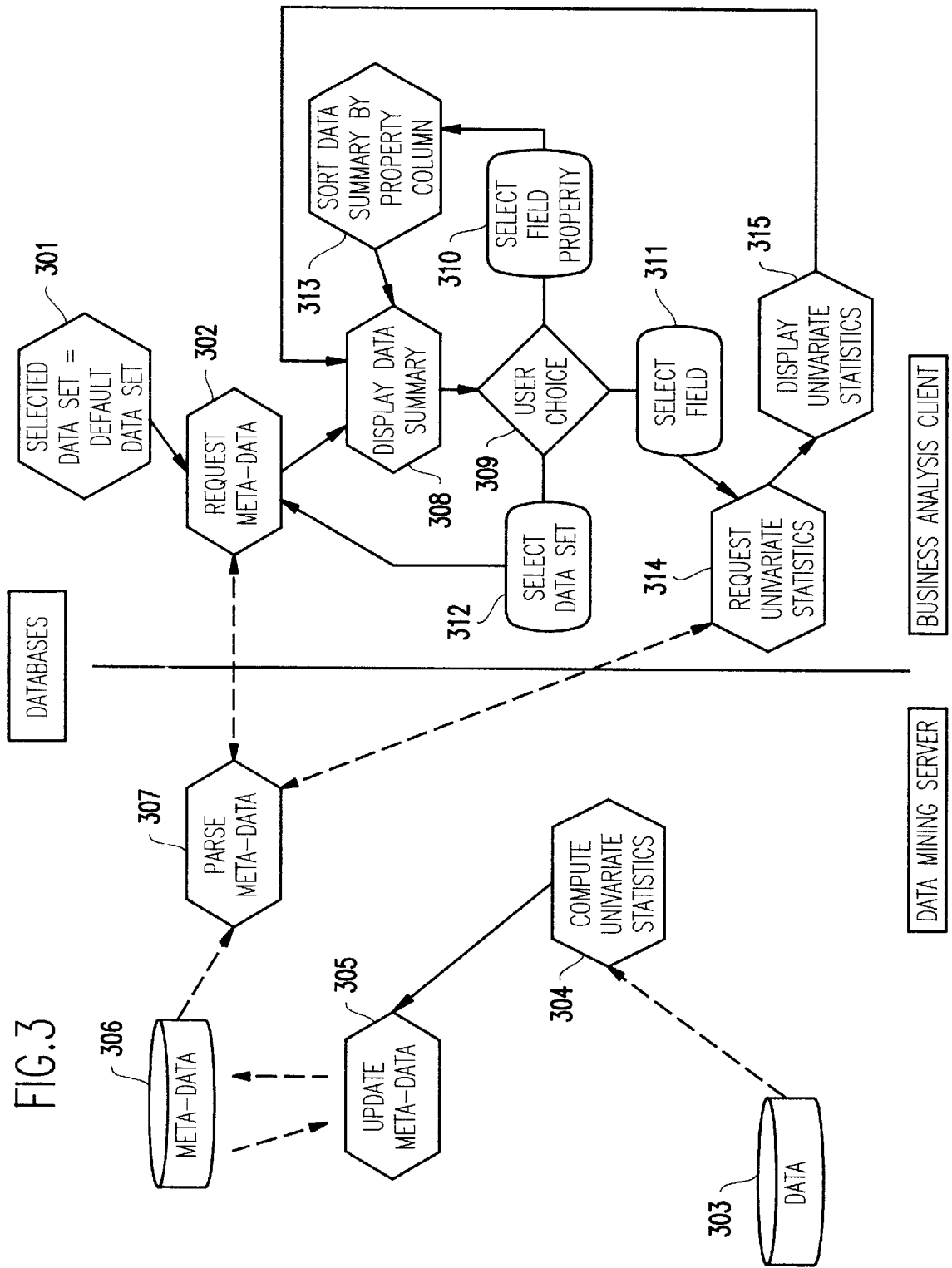

Underwriting Profitability Analysis

File  Edit  View  Help

| Databases | Data Mining | Rule Sets | Viewer | Editing | Scenarios |

Rule set: ProbE_rule_set1 ▽   Training DB: [ ]
Calibration DB: [ ]   Test DB: Big Insurance Co. Data Set1 ▽

| | % Coverage | Pred. PP | Meas. PP | Sig. of Diff. of PP | Pred. Freq. | Meas. Freq. | Sig. of Diff. of Fr |
|---|---|---|---|---|---|---|---|
| Rule 1 | 1.5 | 30.0 | 37.5 | 0.1 | 2.0 | 2.5 | 0.1 |
| Rule 2 | 9.0 | 90.0 | 140.0 | 0.1 | 1.2 | 2.5 | 0.1 |
| Rule 3 | 6.9 | 30.0 | 27.0 | 0.1 | 3.0 | 2.7 | 0.1 |
| Rule 4 | 0.6 | 25.2 | 23.0 | 0.1 | 2.1 | 2.3 | 0.1 |
| Rule 5 | 0.5 | 142.0 | 114.0 | 0.1 | 2.3 | 2.3 | 0.1 |
| Summary | 1.2 | 29.0 | 29.4 | 0.1 | 1.9 | 2.4 | 0.1 |

Rule 4

If Policy Prior Carrier = Less than 12 months or none
            or Pref. prior carrier for past 24 months
            or Sub-standard prior carrier (excl MCA)
            or Drv in hhold cancelled,etc, past 3 Yrs
and Vehicle Grand Total Loss $ Last5Yr <= 390
and Household Number of Drs Age 25-49 = 0
and Rated Driver Driving Experience < 2
Then Pure Premium = 2.12% (= 2.41*0.88%, Population Average)

☐ Start   ☐ JAVA   Underwriting Profi...   ☐ NIPrint32

FIG.8

Underwriting Profitability Analysis

File  Edit  View  Help

Databases | Data Mining | Rule Sets | Viewer | Editing | Scenarios

Rule set: ProbE_rule_set1 ▽    Training DB: [ ]
Calibration DB: [ ]    Test DB: Big Insurance Co. Data Set1 ▽

| | % Coverage | Pred. PP | Meas. PP | Sig. of Diff. of PP | Pred. Freq. | Meas. Freq. | Sig. of Diff. of Fr |
|---|---|---|---|---|---|---|---|
| Rule 1 | 1.5 | 30.0 | 37.5 | 0.1 | 2.0 | 2.5 | 0.1 |
| Rule 2 | 9.0 | 90.0 | 140.0 | 0.1 | 1.2 | 2.5 | 0.1 |
| Rule 3 | 6.9 | 30.0 | 27.0 | 0.1 | 3.0 | 2.7 | 0.1 |
| Rule 4 | 0.6 | 25.2 | 23.0 | 0.1 | 2.1 | 2.3 | 0.1 |
| Rule 5 | 0.5 | 142.0 | 114.0 | 0.1 | 2.3 | 2.3 | 0.1 |
| Summary | 1.2 | 29.0 | 29.4 | 0.1 | 1.9 | 2.4 | 0.1 |

Rule Filter

Show rules mentioning at least one of the following variables:

Policy Prior Carrier
Household Any Maj-Driv/Min-Points Cities?
Household Total Number of Drivers

[Select All]

but not mentioning any of the following:

Policy Prior Carrier
Household Any Maj-Driv/Min-Points Cities?
Household Total Number of Drivers

[Apply] [Undo] [Redo] [Close]

☐ Start  ☐ JAVA  ☕ Underwriting Profi...  ☐ NIPrint32

FIG.10 ly, some policy holders file for claims. Associated
DATA MINING BASED UNDERWRITING PROFITABILITY ANALYSIS

BACKGROUND OF THE INVENTION

1. Field of the Invention

The present invention generally relates to methods of underwriting profitability analysis and, more particularly, to a computer implemented process that applies data mining techniques to historical policy and claims for extracting rules that describe policy holders and uses these rules to classify policy holders into distinct risk groups.

2. Background Description

The first problem addressed by this invention is the robust and rigorous estimation of pure premiums for Property and Casualty (P&C) insurance books of business. These could be ongoing books of business, or new products under consideration. P&C insurance businesses need to constantly evaluate their existing and proposed books of business to identify potential issues and problems with populations they cover. Essentially, associated with each book of business is an insurance product which covers a (potentially vast) group of policy holders that have subscribed to the product. Inevitably, some policy holders file for claims. Associated with claims is their frequency (the rate at which they occur) and their severity (the amount at which they are settled). Insurance companies need to ensure that the premiums being charged are adequate to cover the claims being paid out, and the required profit margin. One approach to ensure this is to estimate the "pure premium" of each policy holder (the premium at which their expected claims payout equals premium charged). If the average pure premium across en entire book of business is equal to or less than the actual premium that goes with the product, then the business is essentially operating at a safe level.

The second problem addressed by this invention is the efficient delivery of the analytic process to a wide cross section of insurance decision makers in the actuarial, marketing, and underwriting areas. These functions could potentially be very disconnected in a firm, yet require a common set of solutions for the first problem detailed above.

SUMMARY OF THE INVENTION

It is therefore an object of the present invention to provide a method of underwriting profitability analysis and the efficient delivery of the analytic process to a wide cross section of insurance decision makers.

It is another object of the invention to provide an underwriting profitability analysis system that leverages an existing investment in databases and improves underwriting business processes.

According to the present invention, there is provided a computer based technique that applies data mining techniques to historical policy and claims for extracting rules that describe policy holders with homogeneous claim frequency and severity characteristics, and then further uses these rule sets to classify policy holders into distinct risk groups, each with its own set of characteristics, including pure premium.

Breaking up a book of business into segments allows identification of sub-populations of policy holders that distinctly deviate from the expected normal pure premium. This identification will allow the insurance business analysts to interactively adjust the eligibility criteria and examine altered characteristics of the covered segments until satisfactory.

Secondly, this invention provides a client server solution that employs JAVA, a network centric language technology, thereby allowing a server based analytic methodology that can be simultaneously accessed across an intranet or internet by several decision makers, from diverse function areas in a firm.

This solution implements a unique computer based interactive capability that offers a "what-if" scenario analysis for exploring books of business by combining data mining rules with insurance product eligibility criteria.

This solution also implements the use of an Internet enabling software platform, such as Java, for the application interface and user control. This allows the user to run light weight interfaces on a variety of typical end-user machines, while off loading the data intensive and computer intensive work to a server on a network.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a block diagram of the underwriting profitability analysis method according to the invention implemented on a client server system;

FIG. 2 is a default user interface screen displayed at the client showing the databases available to a user for a data mining operation;

FIG. 3 is a flow diagram of the client/server databases process that produces the screen of FIG. 2;

FIG. 8 is a user interface screen displayed at the client in response to selecting the Viewer tab and provides the user with a view of rule sets;

FIG. 10 is the user viewer interface screen showing a pop up menu which allows the user to select rule sets using a filtering operation;

DETAILED DESCRIPTION OF A PREFERRED EMBODIMENT OF THE INVENTION

Figure 4:
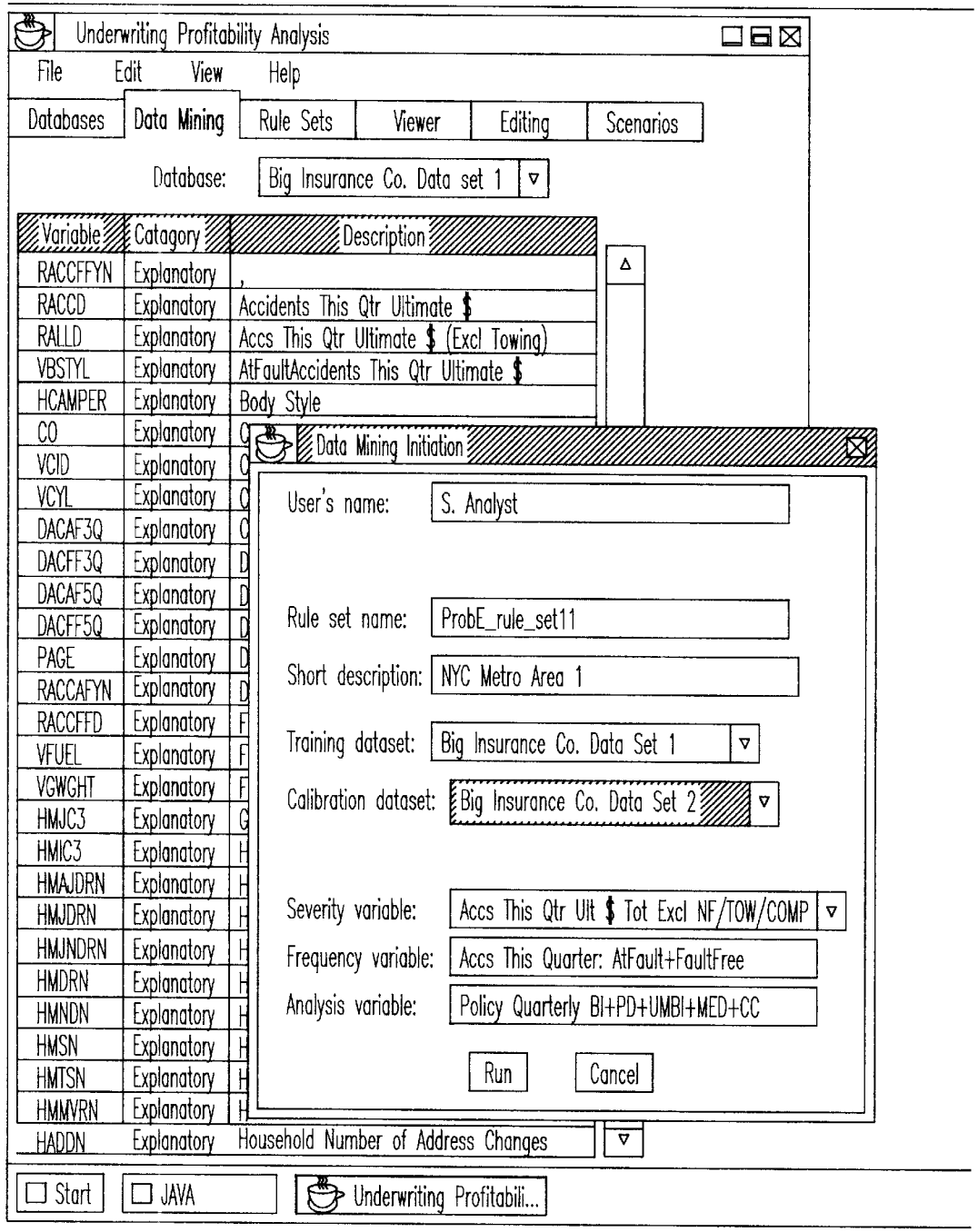
FIG. 4 is a user interface screen displayed at the client in response to selecting the Data Mining tab and is used to initiate a data mining operation at the server.

Referring now to the drawings, and more particularly to FIG. 1, there is shown a block diagram showing the Underwriting Profitability Analysis (UPA) method according to the invention implemented on a client server system. The server 10 is to the left of the dotted line, and the client 20 is to the right of the dotted line. The server 10 is comprised of a data warehouse 101 which is accessed by a data mining server kernel 102. This kernel may be written in the C++ object oriented programming language.

The data warehouse 101 contains data derived from various data bases. There are a plurality of disparate data sources, generally indicated by reference numeral 103. These include internal data and external data. Internal data would include, for example, company transactional data such as policies and claims, while the external data would include demographic and psychographic data. This data is extracted from the several disparate data sources and converted and otherwise formatted into a desired format at 104 prior to storing in a common data warehouse 101. For example, an insurance company's historical data on policies and claims is organized for a particular product (e.g., automobile insurance) by state. Data warehouse 101 can be a disk subsystem of the server 10.

The client 20 comprises a business analysis client 201 which communicates with the data mining server kernel 102. In response to a query by the business analysis client 201, the data mining kernel 102 runs a data mining process on the data in data warehouse 101 for extracting rules for statistically distinct subpopulations with homogeneous pure premium characteristics based upon standard technology from, for example, Predictive Data Mining by Weiss and Indurkhya, Morgan Kaufmann (1997). A user of the system is allowed to define to the solution a book of business (either existing or proposed) by typing in the eligibility criteria for the book as a set of "If" conditions. The business analysis client 201 may be written in the Java programming language.

The business analysis client 201 receives data from the data mining server kernel 102, and the risk group defined by the book of business is segmented into distinct segments by utilizing the pure premium rules extracted by data mining the historical claims and policy data. This generates several outputs. For example, a marketing output 202 might identify new opportunities, an actuarial output 203 might be an estimation of improved profitability, and an underwriting output 204 might suggest enhanced exception management.

An insurance company's historical policy and claims data typically resides on enterprise level databases, in transaction format, typically on a quarterly basis. Several quarters worth of data, usually sixteen quarters or more, is first extracted, for a given business region of interest, such as a state. Since policy and claims data usually reside separately, the extracts are first joined so that records are available, per quarter, on a joint policy-claim basis. From this data, which usually will be in the order of a few gigabytes, a statistically valid sample is extracted for the data mining run.

The data that is mined is a collection of quarterly records. Each record corresponds to vehicle level information for a quarter, including policy, claims, and demographic information. In this data, a pair of fields (known as the "response" variables) will be the target of the data mining process. This pair is usually the claim frequency and claim severity.

The data mining engine extracts from the data a set of rules that utilize the most appropriate subset of the remaining fields in the data (known as the "explanatory" variables) in its antecedent. The consequence of such rules will typically be a prediction of a pure premium for the data points that satisfy the antecedent. The prediction will be probabilistic, i.e., associated with the prediction, in addition to the actual pure premium, will be estimates of the accuracy and confidence in the accuracy. An example of a rule extracted by the data mining process might be "If 'male driver' and 'age less than 25' and 'car type is 2-door sports sedan', Then 'estimated quarterly pure premium=$700' with 'error estimate=0.2' and 'confidence interval=0.008'." Note that the rule set extracted by the data mining run will potentially have many such rules, perhaps in the hundreds.

Additionally, the system will have the user input to the system a set of eligibility criteria that define an insurance product that needs to be investigated. An example of a particular insurance product that is marketed in a state may be targeted towards "males between 25 and 65" with "zero accident violations" and "a car type is 2-door sports sedan or 4-door AWD SUV" with a quarterly premium of $350. A product will typically be able to be defined by a handful of such criteria.

A book of business can now be looked at using the data mining rule set and the insurance product eligibility criteria. For example, the book of business may be a certain geographical region with two million policy holders. The product eligibility criteria, when applied to this book, may further sub-select 40,000 policies; i.e., only those policy holders that are entitled to the product. When the data mining rules are applied to this subset, the rules will break up the eligibility subset into as many segments as there are rules, each with its particular set of pure premium characteristics.

The end user can now examine each of these segments and their estimated pure premiums. For example, if the product's actual premium is $350, and segments that fall within the eligibility list and whose estimated pure premiums are significantly higher than this figure are candidates for exclusion from the product. The user of the solution can now begin interactively experimenting with fine tuning the eligibility criteria for the product, until the segments that are dragging the overall loss down are satisfactorily removed. This "what-if" scenario analysis can be potentially performed on a firm's existing insurance products, as well as new insurance products that may be under consideration.

The application interface that enables the end-user to control the setting up and execution of the data mining, the specification of the product eligibility criteria, and perform the "what-if" scenario analyses is implemented in Java, and runs on typical end-user client platforms. The data mining engine, the scenario analysis functionality, along with the data sets, reside on a network based server.

The graphic user interface (GUI) offers a notebook paradigm, with the user controlling and using the solution through the tab metaphor. The tabs on the notebook correspond to Database Information, Data Mining Initiation, Model Viewing, Model Editing, and Scenario Analysis. These tabs and the intended functionality within each are described below.

Database Information

This tab displays the screen shown in FIG. 2 and will be typically the first screen open by default when the UPA solution is started. It displays the status of all the data bases that are potentially available, for data mining as well as analyses. Using a scroll bar list, a user is able to select a database, and right below, be able to see all the fields that are present in the data, including their names, data types, and descriptions. Clicking on any of the field rows allows more detailed statistics about that field to be displayed to the user.

FIG. 3 is a flow diagram of the database process which produces the screen shown in FIG. 2. Again, following the pattern of FIG. 1, the server process is on the left side of the drawing and the client process is on the right side of the drawing. A user, using the screen of FIG. 2, selects a data set in function block 301. In response to this selection, the client process requests meta-data from the server process in function block 302. The server process meanwhile accesses data from data storage 303 and computes univariate statistics in function block 304. The output of this computation is used in function block 305 to update meta-data in meta-data store 306. The requested meta-data is parsed in function block 307 and returned to the client.

Once the requested meta-data has been returned, it is used to generate and display a data summary at function block 308. The user is now given a choice in user input block 309. The user can select a field property at selection block 310, select a field at selection block 311, or select a data set at selection block 312. If a field property is selected, the client process sorts data summary by property column in function block 313. The sorted data summary is then displayed for the user in function block 308. If the user selects a data field, the client process requests univariate statistics from the server in function block 314. The requested univariate statistics are retrieved from the meta-data store 306 and parsed in function block 307 and returned to the client process. When returned from the server, the univariate statistics are formatted for display in function block 315 and the data displayed in function block 308. If the user selects a data set, the selection goes to function block 302 where the client process requests meta-data from the server process. The returned data is again sent to function block 308 where it is displayed.

Data Mining Initiation

When the data mining tab is selected, the data mining initiation screen shown in FIG. 4 is displayed. This screen allows a user to select one of the databases that are available for a data mining run. In addition to this specification, the user has to also select a frequency response variable, a severity response variable, the explanatory variables, variables to be excluded, and variables for post-mining analysis. When the "Submit Task" button, from the "File" pull down menu, is selected, the application will initiate the server with a data mining run. This run is expected to produce rules for the severity and frequency response variables, using the explanatory variables. The explanatory variables and excluded variables are mutually exclusive; the system will maintain this exclusion. The variables for post-mining analysis are not required explicitly in the data mining run, but are collected in this screen merely as a convenient place holder, and to keep the end-user's focus on the post-mining analysis as the ultimate goal of the solution.

Figure 5:
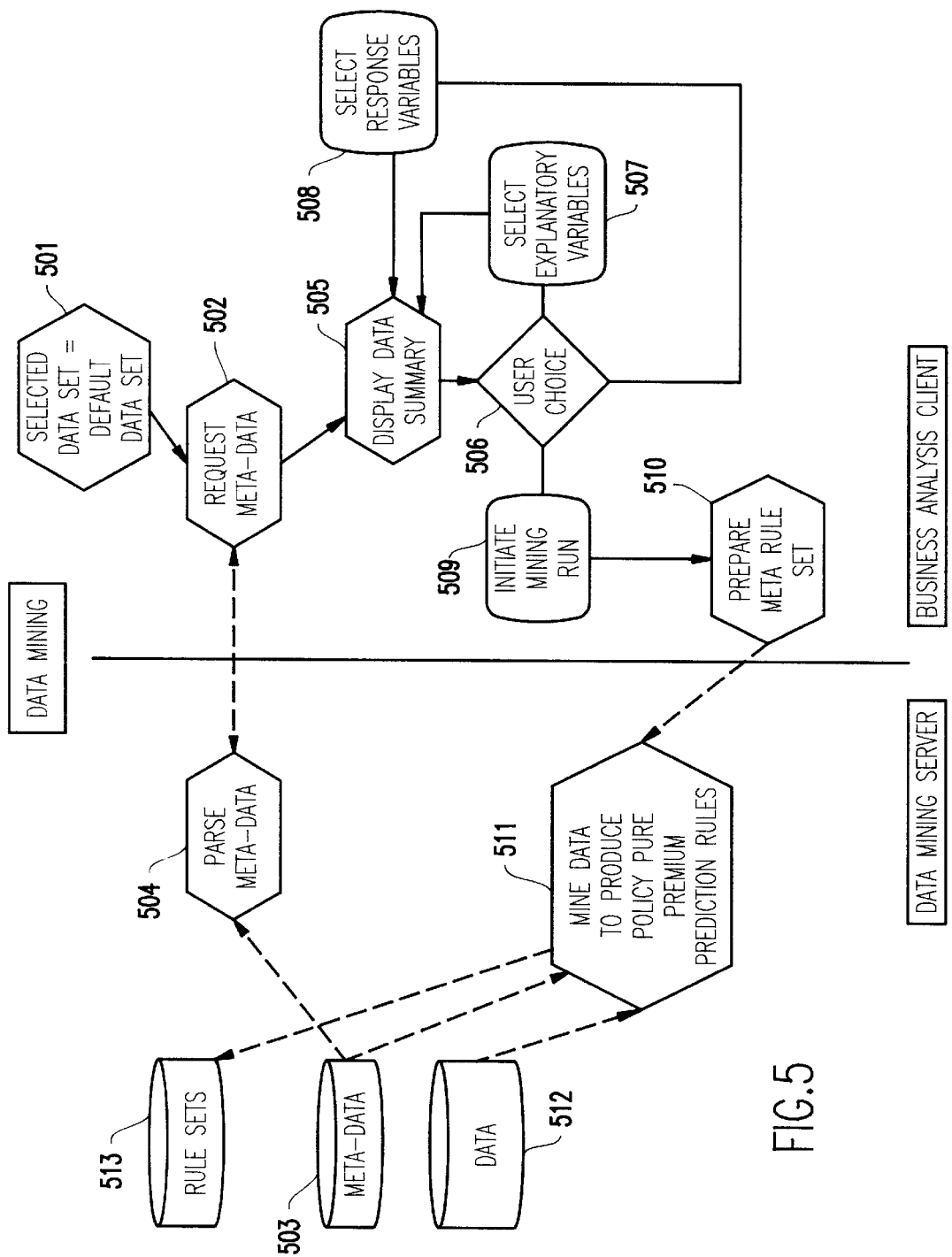
FIG. 5 is a flow diagram of the data mining client/server process initiated from the screen of FIG. 4.

FIG. 5 is the flow diagram of the data mining client/server process. In response to the user selecting a data set in function block 501, the client process requests meta-data from the server process in function block 502. The server process accesses meta-data from data store 503 and parses the meta-data in function block 504 and returns it to the client process.

When the requested meta-data is returned, the client process displays a data summary in function block 505. The user is then presented with choices in user selection block 506. The user can either select explanatory variables in selection block 507, select response variables in selection block 508, or initiate a mining run in selection block 509. If the user selects explanatory variables, the explanatory variables are displayed in function block 505. If the user selects response variables, the response variables are displayed in function block 505. However, if the user selects initiate a mining run, then a call is made to the server process to prepare a meta rule set in function block 510.

In response to this call, the server process mines data to produce policy pure premium prediction rules in function block 511. This is done by accessing data in data store 512 and meta-data store 503. The resulting rule sets are stored in rule sets store 513.

Results Presentation and Analysis

Figure 6:
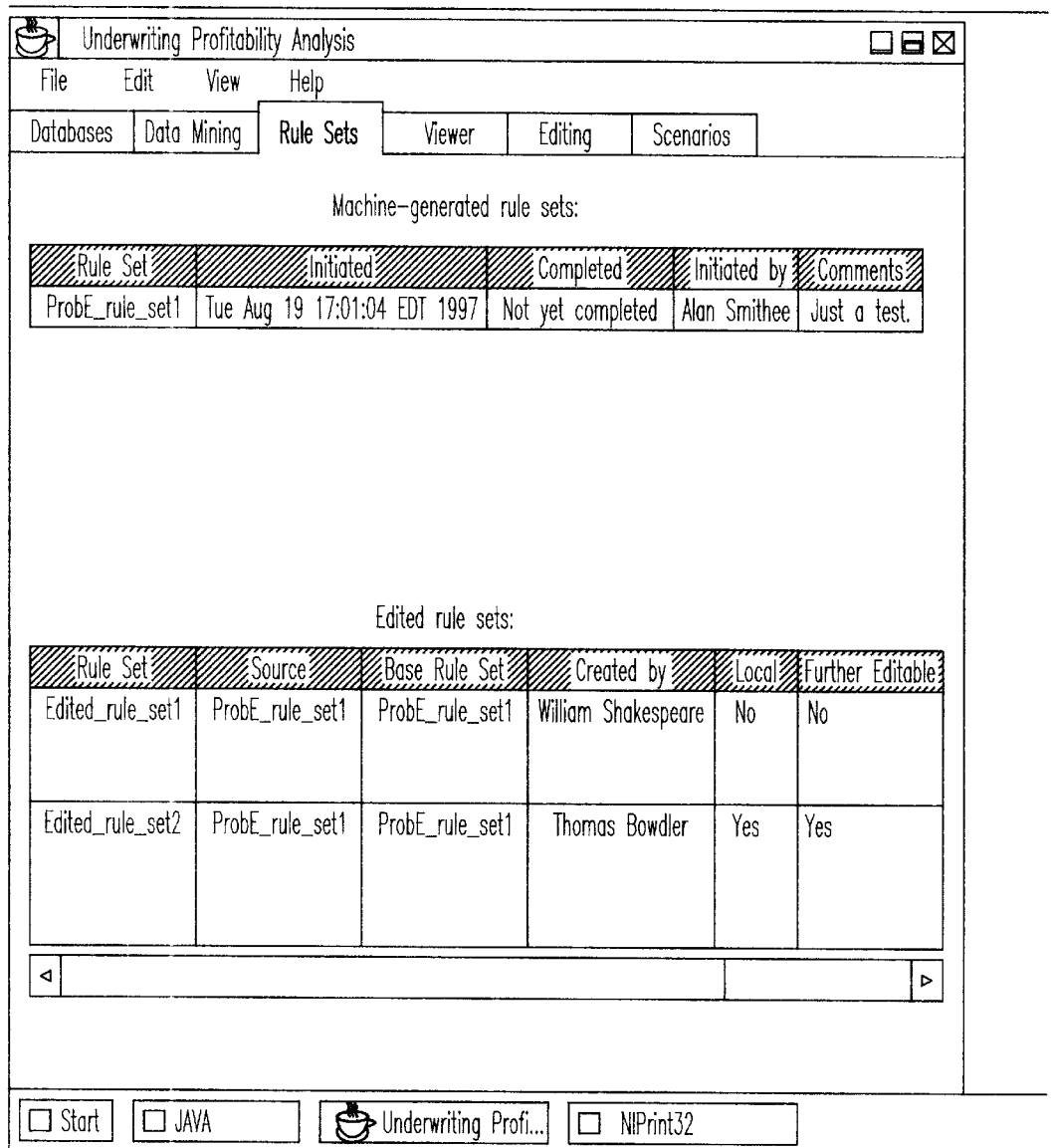
FIG. 6 is a user interface screen displayed at the client in responses to selecting the Rule Sets tab and shows existing models derived from the data mining process.

Results are available for presentation, editing, and business analysis. The screen shown in FIG. 6 is displayed with the Rule Sets tab is selected. This screen lists all the rule sets that are created by data mining runs, as well as edited rule sets that may have been created by the user. In addition, if there is a data mining run that is currently in progress, a pending tasks list displays information about when the run was initiated and when it might expect to complete.

In the case of rule sets extracted by data mining, the name of the rule set, and the dates of initiation and completion are included for distinguishing between the different rule sets. In the case of edited rule sets, the source and base rule sets' names is appended to the name of a user, in the list.

Figure 7:
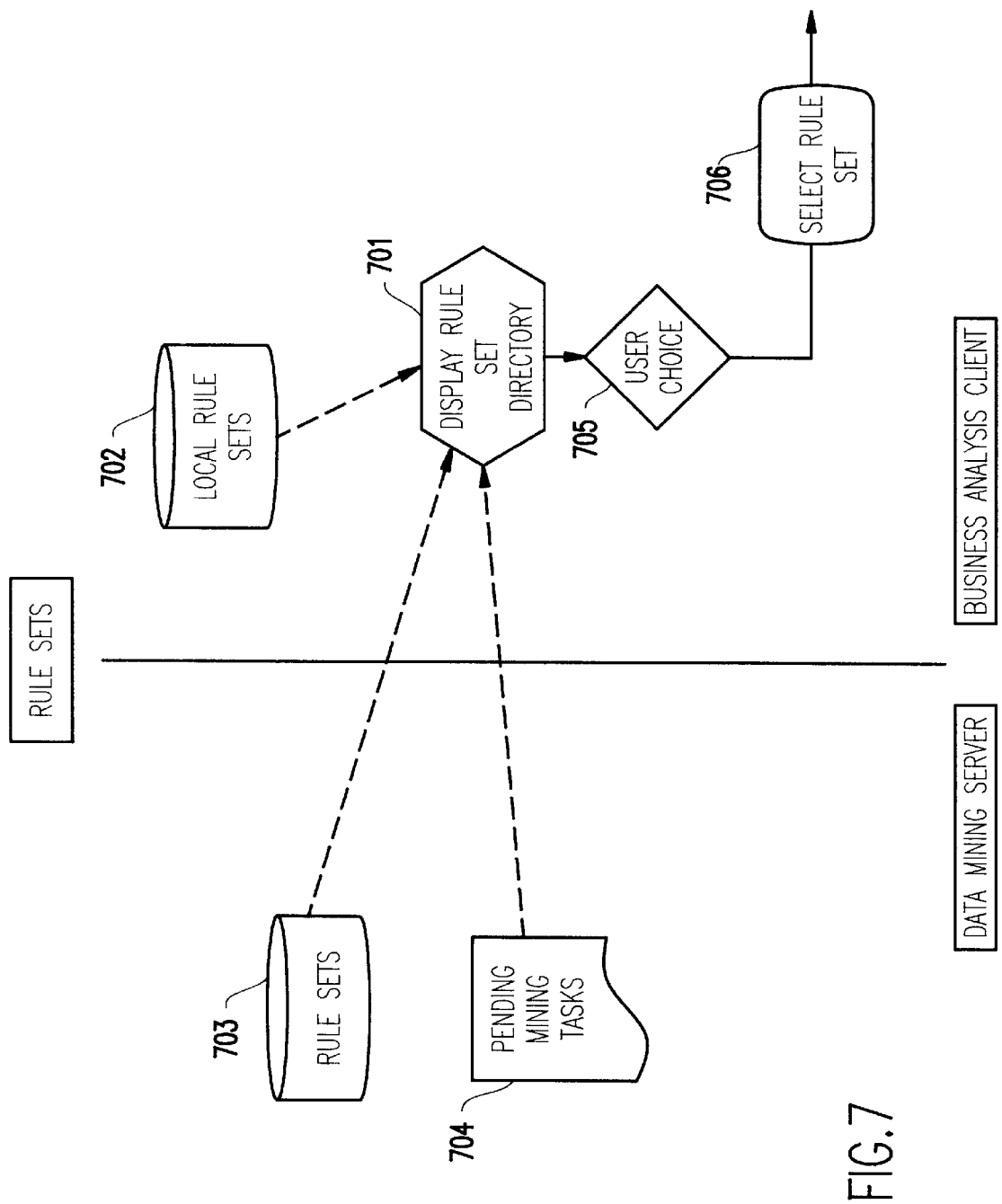
FIG. 7 is a flow diagram of the rule sets display process.

FIG. 7 is the flow diagram of the client/server process for display of the rule sets resulting from a data mining operation. The display function block 701 in the client process access data from a local rule sets store 702 and rule sets from a rule sets store 703 in the server. In addition, the display function 701 access data 704 from the server concerning pending mining tasks. With the displayed rule set directory, including information on pending tasks, the user is prompted to make a selection in user selection block 705. The selected rule set in selection block 706 is then returned to the client process.

It is expected that at this point the end-user will select one of the preexisting data mining models or user edited rule sets for continuing an analysis. In the event that the user is awaiting the pending data mining run before anything can be done, then this screen will be periodically visited by the user, until the data mining run is completed, and the results available.

Model Viewer

When the Viewer tab is selected, the viewer screen shown in FIG. 8 is displayed. This screen allows a user to see in further detail particulars about a model or an edited rule set that has been selected from the existing models screen. In addition to identifying the database name on which the model was trained or evaluated, this screen also displays the accuracy estimate of the model in terms of several statistics. Also, the rules that comprise this model will be available for inspection in this screen. One individual rule will be displayed at a time, but a scroll facility allows the entire rule set to be scrolled through for a rule. The screen will display the actual rule in "If-Then" English-like notation. The individual rule statistics will also be displayed, including a predictor value and a confidence interval, and the coverage of the rule for the database.

Figure 9:
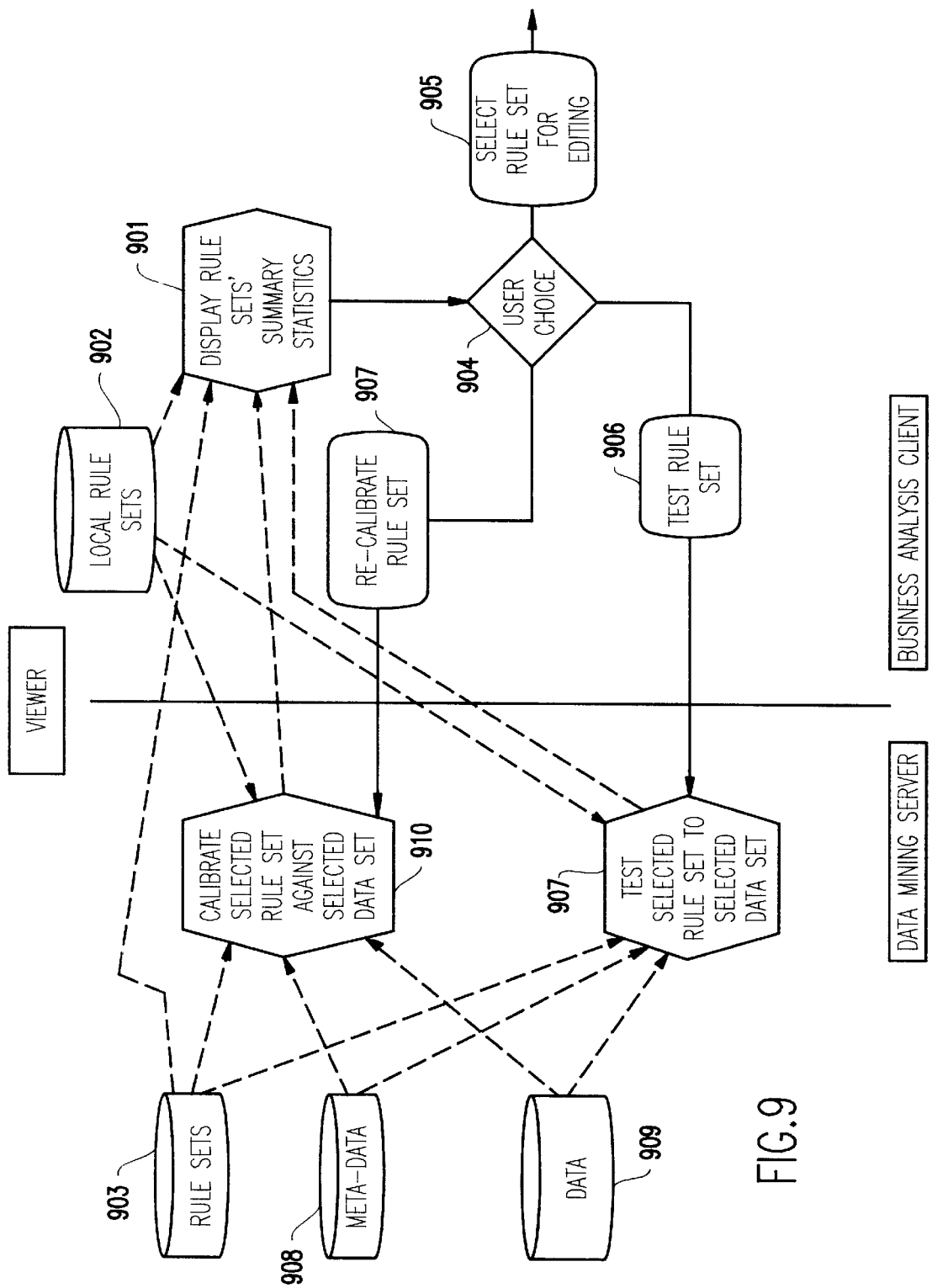
FIG. 9 is a flow diagram of the viewer process initiated from the screen of FIG. 8.

The flow diagram from the viewer client/server process is shown in FIG. 9. In function block 901, rule sets' summary statistics are displayed. This is done by accessing local rule sets from local store 902 and rule sets from the server store 903. The user is given three choices in selection block 904. The user can select a rule set for editing in selection block 905, select to test a rule set in selection block 906, or select to re-calibrate a rule set in selection block 907. If the user selects a rule set for editing, the editor is invoked, as described in more detail below. If the user selects to test a rule set, then a call is made to the server to test the selected rule set to a selected data set in function block 907. This is done by accessing data from the client local store 902, from the server store 903, from the meta-data store 908, and from the data store 909. The result of the test is returned to the client process which displays the data in function block 901. If the user selects to re-calibrate a rule set, a call is made to the server process which calibrates the selected rule set against a selected data set in function block 910. Again, this is done by accessing data from the client local store 902, from the server store 903, from the meta-data store 908, and from the data store 909. The result of the test is returned to the client process which displays the data in function block 901.

The user can also directly jump to applying the selected model to another database, by clicking on the "Test" button from the "File" pull down menu. This will cause the data mining server to apply the selected model to the specified database, and evaluate and report the accuracy of the model on the data.

Creating and Editing Derived and New Rule Sets

Using a rule set extracted by data mining, a user can edit it to create new rule sets, or create new rule sets completely from scratch. One universal mechanism that will be supported in the UPA solution is a pop-up rule selection mechanism for filtering out a desired subset from a base model. The screen shown in FIG. 10 is an instance of this facility. Essentially, given a base rule set, this filer will allow the user to select zero or more explanatory variables that need to be present in a rule for it to be selected. Simultaneously, the user can select another set of zero or more variables that need to be absent in a rule for it to be selected. Using this combination of constrain specification for inclusion and exclusion will permit a powerful mechanism for extracting desired subsets of rules.

Rule Set Creation

Figure 11:
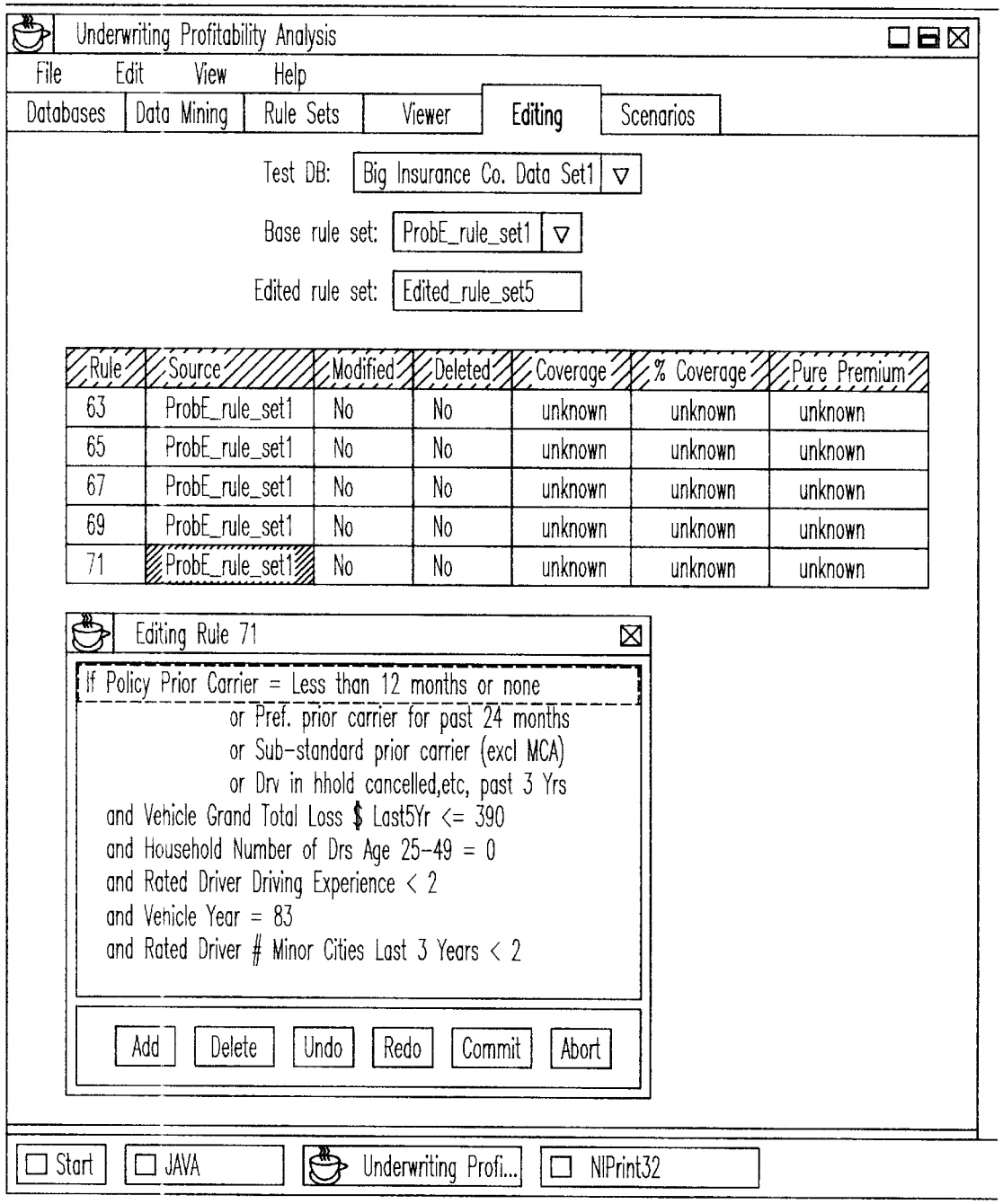
FIG. 11 is a user interface screen displayed at the client in response to selecting the Editing tab and allows the user to create a rule set.

Rule set creation is done using the editing screen shown FIG. 11. This screen is displayed in response to selecting the Editing tab. Rule set creation is the first step in editing or creating new rule sets. It is the intention that the rule sets extracted by the data mining will be preserved in their original form. Any changes desired to be made to these will be essentially done by copying the original model, and then making changes to the copy. The rule set creation screen allows a user to select a source, which could be an original base model extracted by data mining, or an edited rule set created by the user. In addition to using the filtering mechanism described previously, the user can do simple actions like copying rule by rule, or all the rules, into the copy. The copy becomes the target model, to which the user can assign a name, and carry out simple edits, such as individual rule deletions. More advanced modification capability is offered in the subsequent model and rule editing screens.

Editing

The editing screen shown in FIG. 11 allows the user to select and edit a copy or a previously edited copy of a rule set. The screen allows the user to scroll through the rules that comprise the rule set. Individual rules can be deleted, edited, or new rules can be created from scratch. Editing existing rules or creating new rules causes the application to take the user to the rule editing screen. At any instance during the course of the editing, the user can either check individual rules or the rule set as a whole by specifying a database and selecting either "Apply Model" or "Check Rule" from the "File" pull down menu. This checking results in the system reporting to the user the performance of the selected entity on the specified data.

The editing screen shown in FIG. 11 permits a user to edit existing rules or create completely new rules utilizing a pull down menu that constrains the user to the list of allowable variable names and possible tests. The screen is broken up into two parts. One part is the clause editor, in which the user is actually building or modifying a clause to add to a rule, while the other part displays the rule composition as a whole.

Editor

Figure 12:
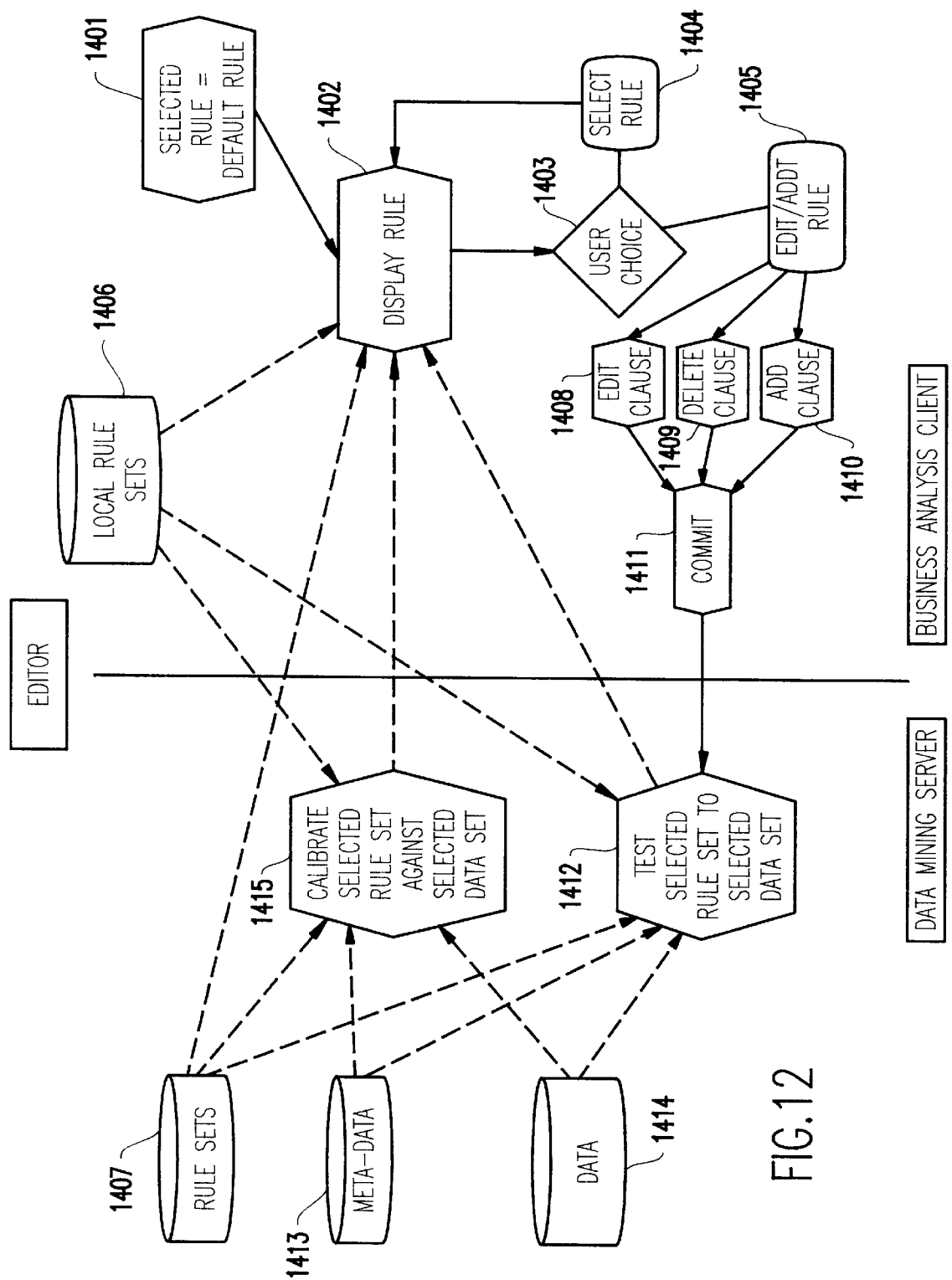
FIG. 12 is a flow diagram of the editor used for rule set creation, model editing and rule editing.

The client/sever editor process is shown in the flow diagram of FIG. 12. This editor is used for the foregoing three functions of rule creation, model editing and rule editing. Using the example of rule editing in the example illustrated in FIG. 12, the selected rule (for example, from selection block 905 in FIG. 9), is input at function block 1401 and the rule is displayed in function block 1402. The user is given two choices in user selection block 1403. The user can either select a rule in selection block 1404 or select to edit or add to a rule in selection block 1405. If the user wishes to select a rule, rules are displayed in function block 1402 for purposes of the user making that selection. This is done by accessing rule sets from local store 1406 and rule sets in the server store 1407. Assuming that the user has made a selection of a rule, the user may then select to edit or add to the rule. Typical editing actions of editing a clause in 1408, deleting a clause in 1409, and adding a clause in 1410 are available to the user. Once the editing action has been completed, it is committed in function block 1411. This act of committing makes a call to the server process to test the selected rule set to a selected data set in function block 1412. This is done by accessing data from the client local store 1406, from the server store 1407, from the meta-data store 1413, and from the data store 1414. The result of the test is returned to the client process which displays the data in function block 1402. The user may also select to re-calibrate a rule set. A call is made to the server process which calibrates the selected rule set against a selected data set in function block 1415. Again, this is done by accessing data from the client local store 1406, from the server store 1407, from the meta-data store 1413, and from the data store 1415. The result of the test is returned to the client process which displays the data in function block 1402.

Scenario Analysis

Figure 13:
FIG. 13 is a user interface screen displayed at the client in response to selecting the Scenarios tab and is used to initiate a scenario analysis.

The scenario analysis subsystem is a crucial piece in the UPA solution that ties in the data mining process to the business problems at hand. The idea here is to allow the user to determine the value of a P&C insurance product by specifying it to the system, and having the system provide critical business information about the product, segment by segment. The scenario analysis screen shown in FIG. 13 is displayed when the user selects the Scenarios tab. Using the scenario analysis screen, the user will specify a database to analyze, a data mining model to be used as the base, and a product/population identifier. A product identifier is essentially a user created rule set, that could either represent an existing product, or a new product under consideration. Once specified, and the "Analyze" button selected from the "File" pull down menu, the system will perform a scenario analysis, and display to the user, in a subsequent screen, a detailed segmentation report.

Figure 14:
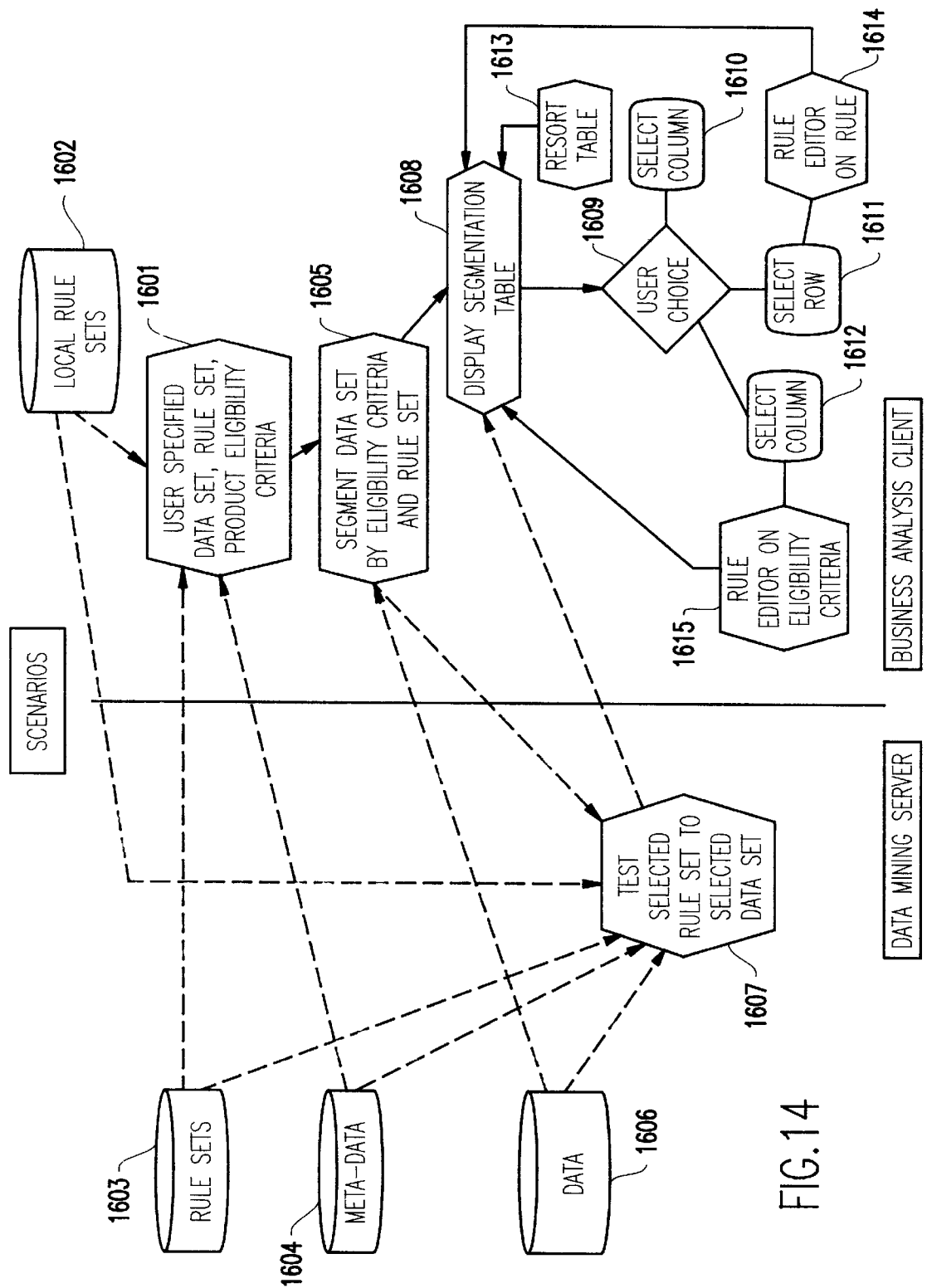
FIG. 14 is a flow diagram of the scenario analysis process.

FIG. 14 is the flow diagram of the client/server scenario analysis process. The user specified data set, rule set, and product eligibility data are input in function block 1601. This is done by accessing local rule sets in client store 1602, rule sets in server store 1603 and meta-data in meta-data store 1604. The specified data set is segmented by eligibility criteria and the rule set in function block 1605. This is done by accessing data in server data store 1606 and making a call to the server to test the selected rule set to a selected data set in function block 1607. This is done by accessing data from the client local store 1602, the server store 1603, the meta-data store 1604 and the data store 1606. Then, in function block 1608, the segmentation table is displayed. The user is given three choices in user selection block 1609. The user can either select a column in selection block 1610, select a row in selection block 1611, or select a column in selection block 1612. If the user selects a column in selection block 1610, the table is resorted in function block 1613 and a return is made to function block 1607 to display the resorted table if the user selects a row, the rule editor on the rule is called in function block 1614 and a return is made to function block 1608. If the user selects a column in selection block 1612, the rule editor on eligibility criteria is called in function block 1615 and a return is made to function block 1608.

The scenario analysis result will first report on the gross statistics on how the product rule set covered the database, and within this coverage, using the base model, will be a detailed segmentation report that breaks down the coverage into individual segments, listed by the segments' coverage, percentage coverage, severity estimate, frequency estimate, pure premium, loss ration, and other entries that may be of interest. In addition, the screen will permit the table to be sorted by any of these columns. This "what-if" style scenario analysis will assist the users to identify problems and opportunities with existing as well as new P&C products.

While the invention has been described in terms of a single preferred embodiment, those skilled in the art will recognize that the invention can be practiced with modification within the spirit and scope of the appended claims.

Having thus described my invention, what we claim as new and desire to secure by letters patent is as follows:

1. A computer implemented method of underwriting profitability analysis comprising the steps of:

accessing existing databases of historical policy and claims;

initiating data mining techniques to the accessed data to extract rules that describe policy holders with homogeneous claim frequency and claim severity characteristics;

using the extracted rules to classify policy holders into distinct risk groups, each with its own set of characteristics, including pure premium; and identifying sub-populations of policy holders that distinctly deviate from the expected normal pure premium to allow the insurance business analysts to interactively adjust the eligibility criteria and examine altered characteristics of the covered risk groups.

2. The computer implemented method of underwriting profitability analysis recited in claim 1 wherein the method is implemented on a client server platform that employs network centric language technology, thereby allowing a server based analytic methodology that can be simultaneously accessed across an intranet or Internet by several decision makers, from diverse function areas in a firm.

3. The computer implemented method of underwriting profitability analysis recited in claim 2 wherein the method is implemented using an Internet enabled software platform wherein the application interface is controllable by a user running a light weight Internet client and wherein the data intensive and computer intensive work is performed on a server on a network connected to the Internet.

4. A computer implemented method of underwriting profitability analysis comprising the steps of:

accessing existing databases of historical polic and claims;

initiating data mining techniques to the accessed data to extract rules that describe policy holders with homogeneous claim frequency and claim severity characteristics;

using the extracted rules to classify policy holders into distinct risk groups, each with its own set of characteristics, including pure premium; and identifying sub-populations of policy holders that distinctly deviate from the expected normal pure premium to allow the insurance business analysts to interactively adjust the eligibility criteria and examine altered characteristics of the covered risk groups, wherein the step of accessing existing databases comprises the steps of:

displaying databases for selection by a user;

responding to a user selection of a database by requesting data from data storage and computing univariate statistics;

updating and parsing meta-data and returning updated and parsed meta-data in response to the data request; and generating and displaying a data summary of the returned updated and parsed meta-data.

5. The computer implemented method of underwriting profitability analysis recited in claim 4 wherein the step of initiating data mining techniques comprises the steps of:

responding to a user selection of a data set for a data mining operation by mining data in the selected data set to produce policy pure premium prediction rules and storing the rules; and displaying a data summary of rule sets from the data mining operation.

6. The computer implemented method of underwriting profitability analysis recited in claim 5 wherein the step of using the extracted rules to classify policy holders into distinct risk groups comprises the steps of:

responding to a user selection of a rule set by displaying summary statistics of the selected rule set; and editing the rule set in response to editing commands from the user.

7. The computer implemented method of underwriting profitability analysis recited in claim 6 wherein the step of identifying sub-populations of policy holders comprises the steps of:

receiving user input specified data set, rule set and product eligibility criteria;

segmenting the data set by eligibility criteria and rule set; and displaying a segmentation table of the segmented data set.

* * * * *